United States Patent [19]
Oka

[11] Patent Number: 4,693,333
[45] Date of Patent: Sep. 15, 1987

[54] POWER TRANSMISSION APPARATUS FOR VEHICLES
[75] Inventor: Yosio Oka, Saitama, Japan
[73] Assignee: Honda Giken Kogyo Kabushiki Kaisha, Tokyo, Japan
[21] Appl. No.: 839,645
[22] Filed: Mar. 13, 1986
[30] Foreign Application Priority Data
  Mar. 22, 1985 [JP] Japan ................... 60-58058
[51] Int. Cl.⁴ .................. F16D 41/02; B62J 15/00
[52] U.S. Cl. .................... 180/233; 180/197; 180/245
[58] Field of Search ............... 180/233, 245, 247, 248, 180/197

[56] References Cited
U.S. PATENT DOCUMENTS
4,493,387 1/1985 Lake et al. ................ 180/248
4,535,869 8/1985 Tsutsumikoshi et al. .......... 180/89.1

FOREIGN PATENT DOCUMENTS
118534 7/1984 Japan .

Primary Examiner—John J. Love
Assistant Examiner—Donn McGiehan
Attorney, Agent, or Firm—Lyon & Lyon

[57] ABSTRACT

A power transmission apparatus for vehicles provided with a front wheel driving device for connecting an output shaft of a power unit to front wheels and a rear wheel driving device for connecting the output shaft to rear wheels, wherein a unidirectional clutch is provided in the front wheel driving device, which clutch comprises an outer member, an inner member and a clutch roller, and is capable of transmitting a driving force only in one direction from a power unit side to a front wheel side.

5 Claims, 2 Drawing Figures

POWER TRANSMISSION APPARATUS FOR VEHICLES

BACKGROUND OF THE INVENTION

1. Field of the Invention

The present invention relates to a power transmission apparatus, and more particularly to an improvement in power transmission apparatus which comprises a front wheel driving device for connecting an output shaft of a power unit to front wheels and a rear wheel driving device for connecting said output shaft to rear wheels.

2. Description of the Prior Art

There has been heretofore known a power transmission apparatus in which a manual clutch is incorporated in a front wheel driving device for obtaining a simultaneous driven state of front and rear wheels and a driven state only of rear wheels which may be suitably alternatively selected by opening and closing the manual clutch (for example, see Japanese Patent Application Laid-Open No. 118,530/84).

In the above-described conventional power transmission apparatus, the switching operation between the simultaneous driven state of front and rear wheels and the driven state only of rear wheels is cumbersome.

The driven state of only rear wheels is required when the vehicle is turned with a small turning radius without allowing the wheels to skid. More specifically, when the vehicle is turned in the simultaneous driven state of front and rear wheels, the turning radius has to be large so as not to impair the synchronism between the front and rear wheel driving devices. Thus, for turning the vehicle with a minimum turning radius without allowing the wheels to skid, the driving of the front wheel has to be stopped for a while.

SUMMARY OF THE INVENTION

It is therefore an object of the present invention to provide a simple and effective power transmission apparatus as described in which when the vehicle is moved forward and turned, power transmission to the front wheels is automatically cut off without requiring any specific operation to obtain the driven state of only the rear wheels.

For achieving the above-described object, the present invention provides an arrangement characterized in that a unidirectional clutch is incorporated in a front wheel driving device, the unidirectional clutch being capable of transmitting a driving force only in one direction from a power unit side to a front wheel side when the vehicle moves forward.

When the vehicle comes into a turning state during forward movement, front wheels rotate at a speed faster than that of rear wheels because the turning radius of the front wheels is larger than that of the rear wheels, and therefore, in the unidirectional clutch, the rotational speed of its output member on the front wheel side becomes higher than that of its input member on the power unit side to assume a skid condition. As a consequence, the front wheel driving device assumes a cutoff state and the power unit continues to drive only the rear wheels through the rear wheel driving device.

DETAILED DESCRIPTION OF THE PREFERRED EMBODIMENT

One embodiment of the apparatus according to the present invention will be described hereinafter with reference to the accompanying drawings.

Figure 1:
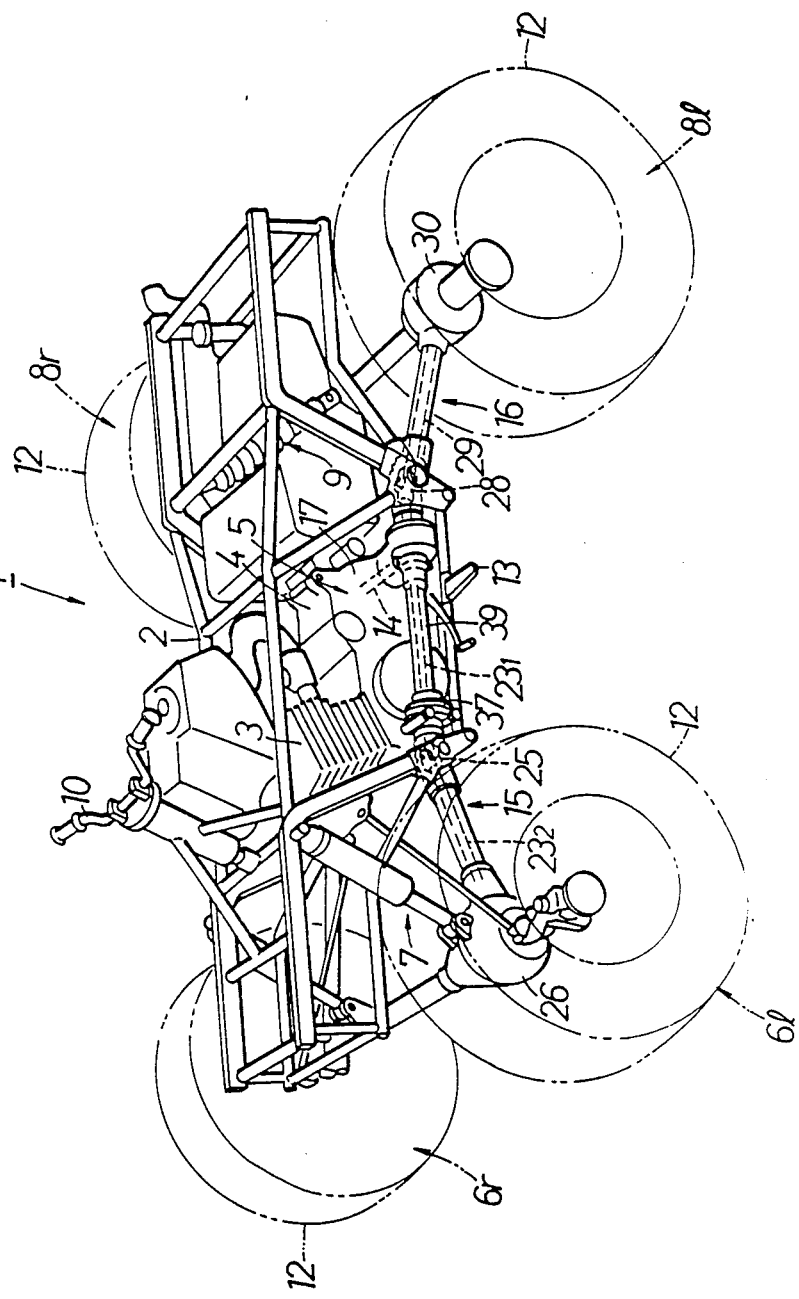
FIG. 1 is a perspective view of a four-wheeled buggy provided with a power transmission apparatus according to the present invention.

Referring now to FIG. 1, a four-wheeled buggy 1 comprises a power unit 5 mounted in a central portion of a vehicle body 2, the power unit 5 including an engine 3 and a speed change gear 4, a pair of left and right front wheels 6l, 6r suspended on the front portion of the body 2 through a front suspension device 7, and a pair of left and right rear wheels 8l, 8r suspended on the rear of the body 2 through a rear suspension device 9, the front wheels 6l, 6r being steerable by operation of a bar-like steering handle 10 supported on the front portion of the body 2.

Baloon type tires 12 are mounted on the front wheels 6l, 6r and rear wheels 8l, 8r, respectively.

A seat (not shown) that an operator straddles is mounted directly on the body 2 above the power unit 5, and a pair of left and right steps 13, 13 (only one of which is shown) are projectingly provided on opposite sides of the lower portion of the body 2. Thus, the operator who puts his feet on the left and right steps 13 while straddling the seat and grips the steering handle 10 by his both hands can shift his weight or body in all directions to assume a free operating attitude.

The front wheels 6l, 6r and rear wheels 8l, 8r are provided with brakes, respectively, though not shown. A brake lever for simultaneously operating the brakes for all the wheels is provided on the steering handle 10, and a brake pedal for operating only the brakes for the rear wheels 6l, 6r is provided in the vicinity of the right-hand step 13.

An output shaft 14 of the speed change gear 4, i.e., the output shaft 14 of the power unit 5, is connected to the front wheels 6l, 6r through a front wheel driving device 15 and to the rear wheels 8l, 8r through a rear wheel driving device 16. These driving devices 15 and 16 are constructed as will be described in the following.

Figure 2:
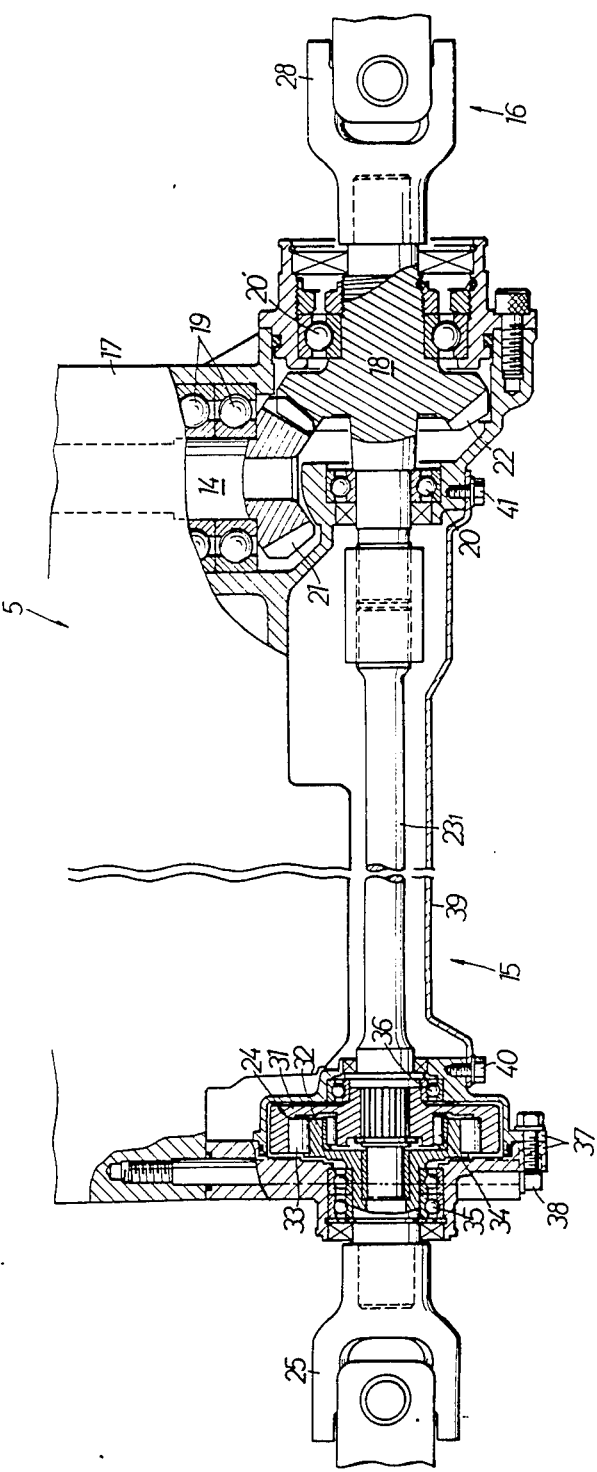
FIG. 2 is a longitudinal sectional plan view showing essential parts of the power transmission apparatus.

As shown in FIG. 2, the power unit 5 has a casing 17 in which are supported the output shaft 14 arranged in a lateral direction of the vehicle and a driving shaft 18 arranged in a longitudinal or travelling direction of the vehicle through bearings 19; 20, 20', both the shafts 14, 18 being connected together through bevel gears 21, 22 meshed with each other.

To the front end of the driving shaft 18 are connected, in order from the rear side, a first front propeller shaft 23$_1$, a unidirectional clutch 24, a front universal joint 25 and a second front propeller shaft 23$_2$ (see FIG. 1). The second propeller shaft 23$_2$ is connected to the left and right front wheels 6l, 6r through a front differential gear 26, thus constituting the front wheel driving device 15.

On the other hand, to the rear end of the driving shaft 18 are connected, in order from the front side, a rear universal joint 28 and a rear propeller shaft 29 (see FIG. 1). The rear propeller shaft 29 is connected to the left and right rear wheels 8l, 8r through a rear differential gear 30, thus constituting the rear wheel driving device 16.

The aforesaid unidirectional clutch 24, as can be seen clearly from FIG. 2, comprises an outer member 31 secured to the front end of the first front propeller shaft $23_1$, an inner member 32 surrounded by the outer member 31 and secured to the rear end of the front universal joint 25 and a clutch roller 33 interposed between opposed circumferential surfaces of these outer member 31 and inner member 32. The clutch roller 33 is capable of transmitting a driving force only in one direction from the outer member 31 as an input member to the inner member 32 as an output member when the vehicle moves forward.

The outer member 31 and inner member 32 are supported by each other through a needle bearing 34 and supported on a clutch casing 37 through roller bearings 35, 36.

The unidirectional clutch 24 is sealingly encased in the clutch casing 37 and the casing 37 is then secured to the casing 17 of the power unit 5 by means of bolt 38.

The aforesaid first front propeller shaft $23_1$ has its outer surface covered with a cover 39, which is in turn secured to the clutch casing 37 and the casing 17 by means of bolts 40, 41.

Next, the operation of the embodiment will be described.

First, where the buggy 1 moves forward along a straight line course or a gently curved course, a driving torque of the output shaft 14 of the power unit 5 is transmitted to the first front propeller shaft $23_1$ and rear universal joint 28 through the bevel gears 21, 22 and driving shaft 18. The driving torque transmitted to the first front propeller shaft $23_1$ is transmitted to the front universal joint 25 through the unidirectional clutch 24 and further transmitted to the second front propeller shaft $23_2$ and front differential gear 26 to drive the left and right front wheels 6l, 6r.

On the other hand, the driving torque transmitted to the rear universal joint 28 from the driving shaft 18 is transmitted to the rear differential gear 30 through the rear propeller shaft 29 to drive the left and right rear wheels 8l, 8r. Thus, the simultaneous driven state of the front wheels 6l, 6r and rear wheels 8l, 8r can be obtained and the buggy 1 can exhibit an excellent forward movement travel.

Then, when the buggy 1 enters a turning course during forward movement, the front wheels 6l, 6r rotate at speeds faster than those of the rear wheels 8l, 8r because the turning radius of the front wheels 6l, 6r is larger than that of the rear wheels 8l, 8r and therefore, in the unidirectional clutch 24, the rotational speed of the inner member 32 becomes higher than that of the outer member 31 to assume a skid condition. As a consequence, power transmission from the first front propeller shaft $23_1$ to the front universal joint 25 is cut off whereby the driving torque of the output shaft 14 is transmitted only to the rear wheels 8l, 8r via the transmission route similar to that as previously described.

Thus, only the rear wheels 8l, 8r are placed in the driven state, and the front wheels 6l, 6r serve as follower wheels. Accordingly, the buggy 1 can be turned with a minimum turning radius without skidding the front and rear wheels 6l, 6r; 8l, 8r.

As described above, according to the present invention, a unidirectional clutch capable of transmitting a driving force only from a power unit side to a front wheel side when the vehicle moves forward is incorporated into a front wheel driving device, so that when the vehicle is turned during forward travelling, the transmission of power to the front wheels can be automatically cut off by the skidding action of the unidirectional clutch, and thus the operator can obtain the driving state only for rear wheels without any operation of the front wheel driving device. Then, the vehicle can be turned with a minimum turning radius without skidding the wheels.

What is claimed is:

1. A power transmission apparatus for a vehicle comprising:
    an output shaft for transmitting power from a power unit to the front and rear wheels of said vehicle;
    a front wheel driving device for driving the vehicle front wheel;
    a rear wheel driving device for driving the vehicle rear wheel;
    a driving shaft operatively driven by said output shaft interposed between said front wheel driving device and said rear wheel driving device and having one end connected to said front wheel driving device and the other end connected to said rear wheel driving device; and
    said front wheel driving device including a unidirectional clutch for transmitting a driving force during forward movement of the vehicle only in one direction from said power unit to the vehicle front wheel.

2. A power transmission apparatus according to claim 1, wherein said apparatus is disposed on one lateral side of a body of the vehicle and said driving shaft is disposed to extend in a longitudinal direction of the body.

3. A power transmission apparatus according to claim 1, wherein said unidirectional clutch comprises a first member leading to the power unit side, a second member leading to the front wheel side and being in relation to the first member to surround one inside the other, and a clutch roller interposed between said first and second members, said clutch roller being adapted to transmit a driving force between the first and second members only in a direction from the power unit side to the front wheel side.

4. A power transmission apparatus according to claim 1, wherein said front wheel driving device includes a first propeller shaft connected at a rear end thereof to said one end of the driving shaft and a second propeller shaft associated at a front end thereof with said front wheel, said unidirectional clutch being interposed between the first and second propeller shafts and comprising a first member connected to a front end of the first propeller shaft, a second member connected to a rear end of the second propeller shaft and related to said first member so as to surround one inside the other, and a clutch roller interposed between said first and second members.

5. A power transmission apparatus according to claim 1, wherein said unidirectional clutch is wholly accommodated in a clutch casing and is secured to a body of the vehicle by fixing the clutch casing to the body.

* * * * *